Nov. 20, 1945.　　　R. A. KENNEDY　　　2,389,514
SPRING MOTOR DRIVEN GENERATOR
Filed April 14, 1944
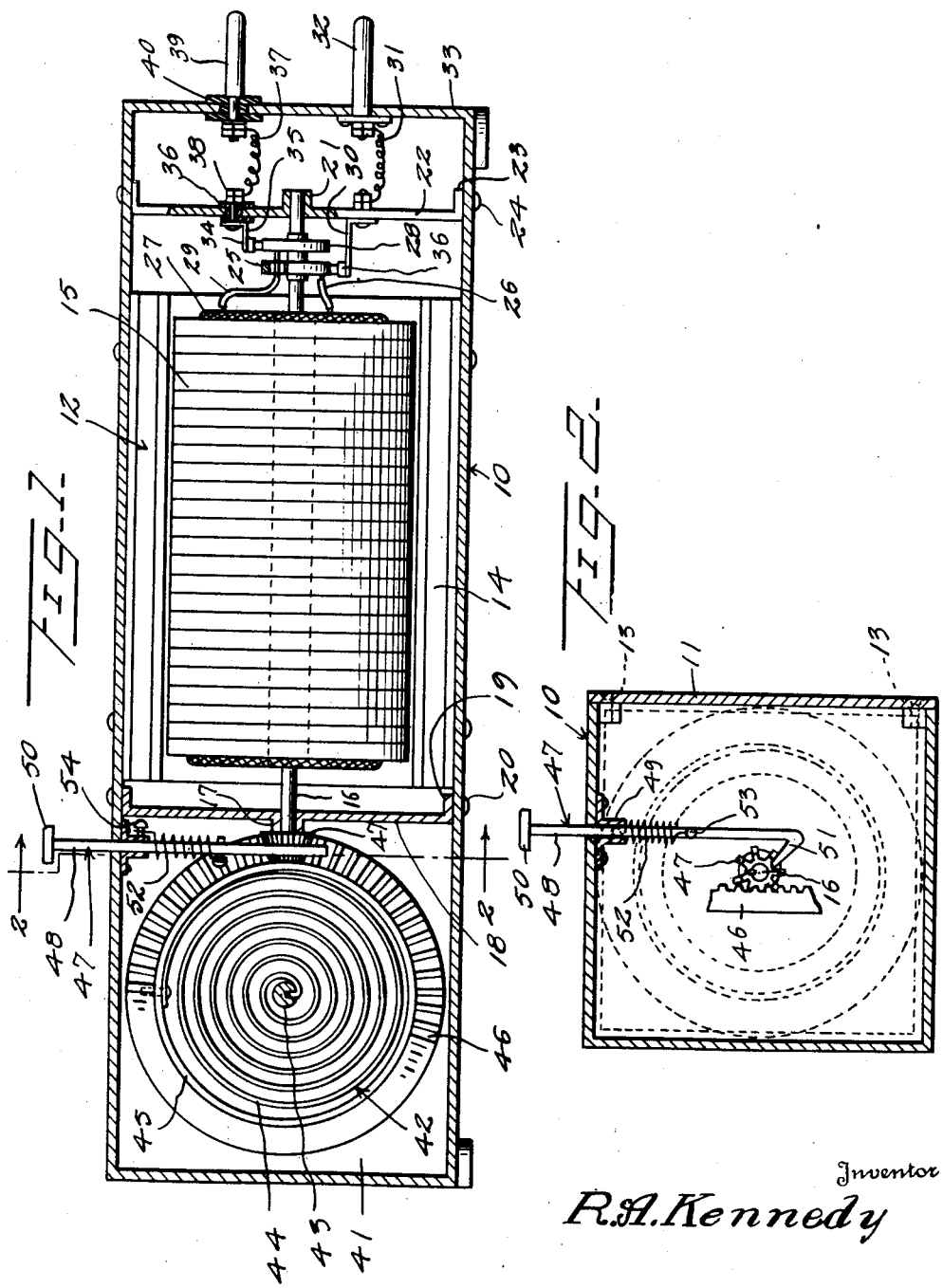
Inventor
R.A.Kennedy
By Kimmel & Crowell
Attorneys Patented Nov. 20, 1945

2,389,514

UNITED STATES PATENT OFFICE 2,389,514

SPRING MOTOR DRIVEN GENERATOR

Raymond A. Kennedy, Sioux City, Iowa

Application April 14, 1944, Serial No. 531,085

2 Claims. (Cl. 171—76)

This invention relates to a spring-motor operated electric generator.

An object of this invention is to provide an electric generator which is operated by a spring motor to provide power for use in an electric livestock prodder.

Another object of this invention is to provide, in a device of this kind, a normally engaged spring-pressed latch for holding the motor inoperative, the latch being positioned so that pressure thereon will move it into released position to provide for the generation of electric current to shock the animal.

A further object of this invention is to provide a device of this kind which can be made in fairly small size so that it will not be unduly heavy and can be easily handled by the operator.

In the drawing:

Figure 1 is a longitudinal section of an electric livestock prodder constructed according to an embodiment of this invention; and Figure 2 is a transverse section partly broken away taken on the line 2—2 of Figure 1.

Referring to the drawing, the numeral 10 designates generally a housing which, in the present instance, is substantially square in transverse section and includes a removable wall or plate 11 secured by fastening members 13 to the adjacent edges of the housing. The housing 10 has mounted therein an electric generator generally designated as 12. The generator 12 includes a stator or field 14 which is fixed to the housing 10 and also includes a rotor or armature 15. The armature 15 is provided with a shaft 16 which is journalled in a bearing 17 carried by a supporting bar 18 having right angular end portions 19 secured by fastening members 20 to the inner side of the housing 10. The shaft 16 is also journalled in a bearing 21 carried by a supporting bar or plate 22 at the opposite end of the field 14 and the supporting member 22 is provided with outturned end portions 23 secured by fastening members 24 to the housing 10. The shaft 16 has secured thereto at one end of the armature 15 a commutator means including a circular band 25 which is insulated from and secured to the shaft 16 and which is connected by means of a conductor 26 to one end of a coil 27 forming part of the armature 15. A second band 28 is secured to and insulated from the shaft 16 and is connected by a conductor 29 to the opposite end of the coil 27. A brush 30 carried by a support 31 engages the commutator band 25 and is connected by means of a conductor 31 to a terminal 32. The terminal 32 is secured to an end wall 33 of the housing 10 and is adapted to project from the end wall 33 so that the terminal 32 may contact the animal so that when the generator 12 is operating, the animal will be subjected to an electric shock. A brush or wiper 34 carried by a support 35 engages the commutator band 28 and the supporting member 35 is insulated from the shaft supporting member 22 by insulation 36. A conductor 37 is connected at one end to a terminal 38 which extends through the insulation 36 and the opposite end of the conductor 37 is connected to the inner end of the outer terminal 39. The outer terminal 39 is spaced from the terminal 32 and is insulated from the end wall 33 by insulation 40. The terminal 39 projects from the end wall 33 and is spaced laterally from the terminal 32 so that when the two terminals 32 and 39 are energized by operation of the generator 12, an electric current will pass between the two terminals, which will shock the animal.

The housing 10 is provided at one end thereof with a motor chamber 41 in which is positioned a spring motor 42. The motor 42 includes a spring shaft 43 having one end of a spring 44 connected thereto and the opposite end of the spring 44 is connected to a barrel 45. It will be understood that the shaft 43 also has associated therewith a conventional pawl and ratchet so that the shaft 43 may be turned to wind the spring 44 thereabout, and the shaft will thereby be held against rotation in one direction. The spring 44 is wound by means of a key (not shown) on the projecting end of the shaft 43, in the ordinary conventional manner. The barrel 45 has secured to the outer side thereof a bevel gear 46. The bevel gear 46 is adapted to mesh with a pinion 47 which is fixed to the shaft 16 so that when the gear 46 is rotated upon release of the spring-pressed latch, as will be hereinafter described, the driving gear 46 will rotate the shaft 16 and the armature 15.

The shaft 16 and the motor 42 are normally held against rotation by means of a spring-pressed-latch generally designated as 47. The latch 47 includes an elongated endwise movable shaft 48 which is slidable in a guide 49 carried by the housing 10, and the outer end of the shaft 48 has secured thereto a button or knob 50. The inner end of the shaft 48 is formed with a reverted bill 51 which is bent at an acute angle to the shaft 48 and is adapted to engage between a pair of teeth on the pinion 47. The shaft 48 is constantly urged to a latching position by means of a spring 52. The spring 52 has one end thereof secured to a pin 53 carried by the shaft 48 and the other or outer end of the spring 52 engages a pin 54 which is carried by the guide 49. The spring 52 constantly urges the shaft to move outwardly and maintains the bill 51 in engagement with the pinion 47. When the button or knob 50 is pressed inwardly, the bill 51 will move out of engagement with the pinion 47 so that motor 42 may then freely rotate the armature 15. As armature 15 is rotated, an electric current will be generated thereby and as terminals 32 and 39 contact with the calf or other animal at spaced points, the animal will be subjected to an electric shock of low amperage and high voltage.

In the use and operation of this device, the housing 10 may be held in the hand of the operator with a thumb or finger engaging over the knob 50. When it is desired to have the animal move in the desired direction, terminals 32 and 39 are contacted with the animal and at this time knob 50 is pushed inwardly. Inward movement of knob 50 will release pinion 47 and the spring 44 will thereupon rotate driving gear 46 and rotate armature 15 at a rate sufficient to generate a high voltage current. This current will be communicated through terminals 32 and 39 to the animal so that when the animal receives the shock, it will immediately jerk away and move in the desired direction.

What is claimed is:

1. A generator unit comprising a housing, an electric generator in said housing, a pair of terminals carried by said housing projecting from the latter and connected to said generator, a spring motor in said housing, a beveled gear connecting said motor with the armature of said generator, a ring gear having beveled teeth meshing with said beveled gear, and a spring-pressed latch engageable with said gear for normally holding said bevel motor and generator inoperative.

2. A generator unit comprising a housing, an electric generator in said housing, a pair of terminals carried by said housing projecting from the latter and connected to said generator, a spring motor in said housing, gears connecting said motor with the armature of said generator, and a spring-pressed latch engageable with one of said gears for normally holding said motor and generator inoperative, said latch comprising an endwise movable bar, a gear engaging bill carried by said bar, a guide for said bar carried by said housing, and a spring-about said bar constantly urging the latter to gear engaging position, said gears including a ring gear having bevelled teeth and a bevel gear carried by said armature.

RAYMOND A. KENNEDY.